United States Patent [19]
Hackett

[11] Patent Number: 5,421,634
[45] Date of Patent: Jun. 6, 1995

[54] TRUCK BED AND TRUCK LINER

[76] Inventor: Henry E. Hackett, 2878 E. 600 South, Warren, Ind.

[21] Appl. No.: 267,858

[22] Filed: Jun. 29, 1994

Related U.S. Application Data

[63] Continuation of Ser. No. 109,929, Aug. 23, 1993, abandoned.

[51] Int. Cl.⁶ .............................................. B60R 13/01
[52] U.S. Cl. ................................... 296/182; 296/39.2
[58] Field of Search ............... 296/183, 182, 39.2, 296/38

[56] References Cited

U.S. PATENT DOCUMENTS

| | | | |
|---|---|---|---|
| 1,053,795 | 2/1913 | Ellis | 296/38 |
| 3,653,710 | 4/1972 | Barnard . | |
| 3,881,768 | 5/1975 | Nix . | |
| 4,215,898 | 8/1980 | Ulics | 296/183 |
| 4,333,678 | 6/1982 | Mönoz et al. . | |
| 4,491,362 | 1/1985 | Kennedy | 296/183 |
| 4,572,568 | 2/1986 | Kapp et al. . | |
| 4,763,945 | 8/1988 | Murray . | |
| 4,872,720 | 10/1989 | Nagy . | |
| 4,944,612 | 7/1990 | Abstetar et al. | 296/39.2 |
| 4,976,490 | 12/1990 | Gentle | 296/183 |
| 5,100,193 | 3/1992 | Oprea et al. . | |
| 5,137,322 | 8/1992 | Muirhead | 296/39.2 |
| 5,145,309 | 9/1992 | Foster | 296/183 X |
| 5,188,418 | 2/1993 | Walworth et al. | 296/183 |

FOREIGN PATENT DOCUMENTS 669054  3/1952  United Kingdom ................ 296/183

Primary Examiner—Robert J. Oberleitner
Assistant Examiner—Gary C. Hoge
Attorney, Agent, or Firm—Lundy and Associates

[57] ABSTRACT

A truck bed or a truck bed liner having bottom and front and side upstanding walls. The front and side walls upstand from the front and side boundaries of the bed. A tailgate is connected to the bed bottom at the rear boundary of the bed bottom. The tailgate is movable between a closed position and an open position. The bottom having a flat surface adjacent to the tailgate with an area sufficiently large to allow debris on the surface to be swept into a pile by a conventional dustpan and broom whereby the bed may be swept clean of debris and removed without having any debris clog the mechanism allowing the tailgate to move between its open and closed positions.

16 Claims, 2 Drawing Sheets

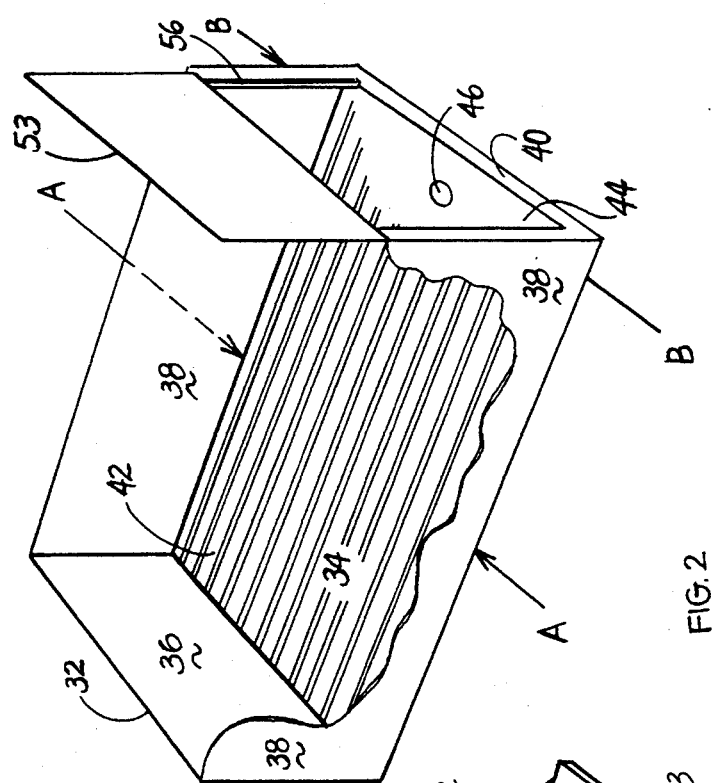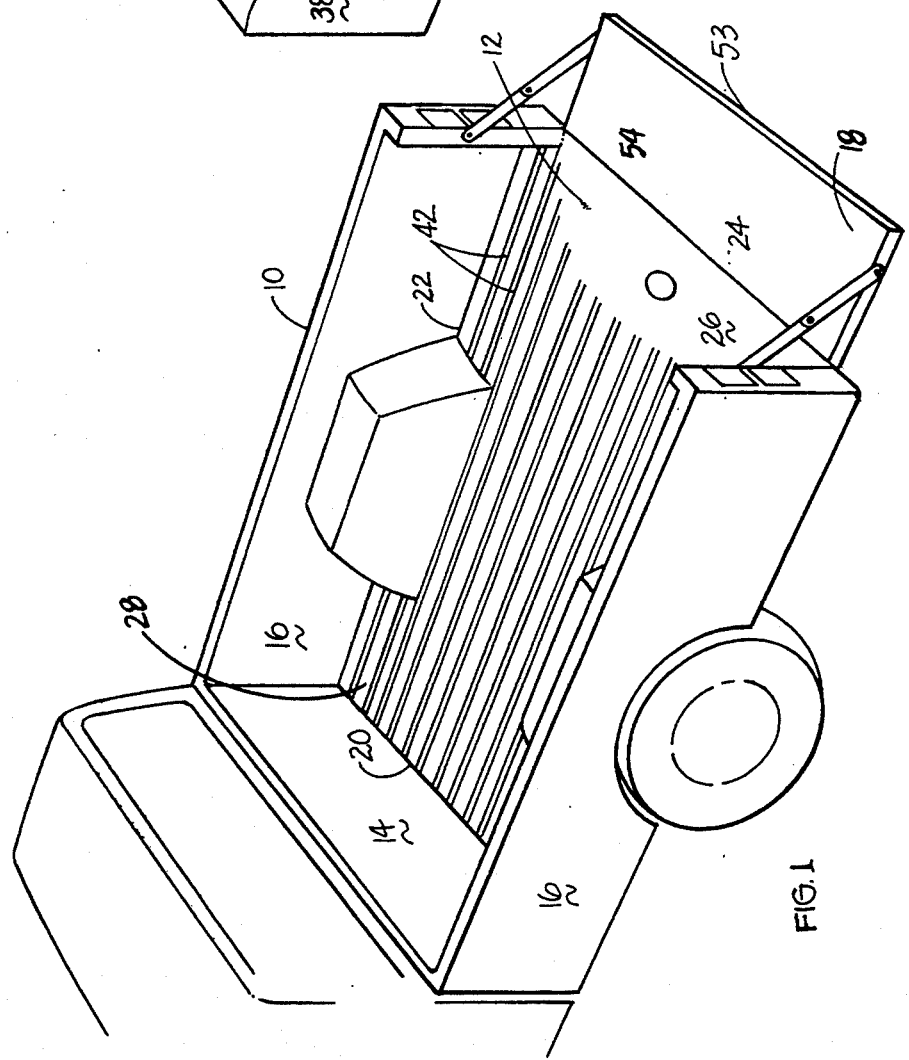

TRUCK BED AND TRUCK LINER

This is a continuation of application Ser. No. 08/109,929 filed on Aug. 23, 1993, now abandoned.

BACKGROUND OF THE INVENTION

The present invention relates to truck beds and truck liners, and more particularly to truck beds and truck liners of small trucks which double as personal vehicles and business vehicles.

Pick-up trucks have become increasingly popular. In some sections of the country, pick-up trucks out sell passenger cars. Many families utilize the pick-up truck for both a commercial vehicle and a family car. Other truck uses make it desirable to maintain the truck bed relatively clean.

In pick-up trucks and other trucks in which the bed is periodically swept of debris, debris commonly is swept rearwardly onto the tailgate and out of the truck. In these instances, many times debris that is swept toward the tailgate becomes lodged in the tailgate hinge or other mechanism and either prevents or restrains tailgate movement. This is to be avoided for trouble-free tailgate operation.

A number of solutions have been proposed. One solution is to include a truck bed liner which has a flap which folds into the truck when the tailgate is in a closed position and folds outwardly of the truck and over the tailgate when the tailgate is open allowing the debris in the truck bed to be swept over the tailgate and onto the ground. This flap is not preferred any time the truck bed needs to Be swept with the truck bed being partially filled. In these instances, the flap cannot be moved over the tailgate and the truck bed liner offers no solution to the above problem.

Further complicating the matter is that most truck beds are ribbed. These ribs provide for structural strength of the truck bed and at the same time, allow for easy loading by reducing the frictional forces of sliding a load onto the truck bed. However, these ribs prevent debris in the truck bed from being swept into a pile as if one was sweeping a floor. If the debris cannot be swept into a pile, it is not easy to pick up the debris short of the tailgate. Furthermore, the debris between one set of ribs cannot easily be transferred to the space between another set of ribs without leaving debris in the truck bed.

In those existing truck beds which have this problem with the cleaning of the truck bed, a new and improved truck bed liner may be devised to solve the problem and make the truck bed more easily cleanable. In this embodiment, the truck bed liner is provided in which the truck bed is redesigned to allow it more cleanable.

It is therefore highly desirable to provide an improved truck bed.

It is also highly desirable to provide an improved truck bed liner.

It is also highly desirable to provide an improved truck bed and an improved liner by which debris is more easily swept from the truck bed.

It is also highly desirable to provide an improved truck bed and an improved liner in which the debris may be swept from the truck without passing the debris over the tailgate.

It is also highly desirable to provide an improved truck bed and an improved liner which allows for debris to be removed from the truck without any of it being lodged in the tailgate mechanism.

It is also highly desirable to provide an improved truck bed and an improved liner which has all of the above features.

SUMMARY OF THE INVENTION

It is therefore an object of the invention to provide an improved truck bed.

It is also an object of the invention to provide an improved truck bed liner.

It is also an object of the invention to provide an improved truck bed and an improved liner by which debris is more easily swept from the truck bed.

It is also an object of the invention to provide an improved truck bed and an improved liner in which the debris may be swept from the truck without passing the debris over the tailgate.

It is also an object of the invention to provide an improved truck bed and an improved liner which allows for debris to be removed from the truck without any of it being lodged in the tailgate mechanism.

It is finally an object of the invention to provide an improved truck bed and an improved liner which have all of the above features.

In the broader aspects of the invention there is provided a truck bed or a truck bed liner having bottom and front and side upstanding walls. The front and side walls upstand from the front and side boundaries of the bed. A tailgate is connected to the bed bottom at the rear boundary of the bed bottom. The tailgate is movable between a closed position and an open position. The bottom having a flat surface adjacent to the tailgate with an area sufficiently large to allow debris on the surface to be swept into a pile by a conventional dustpan and broom whereby the bed may be swept clean of debris and removed without having any debris clog the mechanism allowing the tailgate to move between its open and closed positions.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 1 is a perspective view of an improved truck bed having the structure of the invention.

FIG. 2 is a perspective view of an improved truck bed liner having the structure of the invention.

DESCRIPTION OF A SPECIFIC EMBODIMENT

Figure 3:
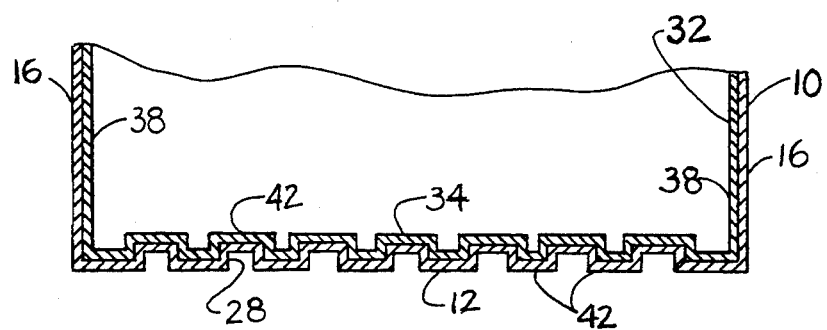
FIG. 3 is a fragmentary, cross-sectional view of one embodiment of the truck bed liner of the invention of FIG. 2 mounted in a truck bed taken substantially along section line A—A of FIG. 2.

The improved truck bed 10 of the invention is shown in FIG. 1 to include a bottom 12, front 14, and side 16 upstanding walls and a tailgate 18. Side 16 walls upstand from the front 20 and side 22 boundaries of bottom 12, respectively. Tailgate 18 is connected to said bed bottom 12 at said rear boundary 24. Tailgate 18 is movable between a closed position and an open position 53. Bed bottom 12 has a flat surface 26 adjacent to said tailgate 18 from said rear boundary 24 of said bed bottom 12. Flat surface 26 is provided with an area sufficiently large to allow debris to be swept into a pile on surface 26 to be removed from surface 26 by a conventional dustpan and broom without any danger whatsoever of the debris being swept into the hinge mechanism of the tailgate. In a specific embodiment, flat surface 26 has a shape which is the cord of a circle having a finite radius.

In a commonly found specific embodiment, tailgate 18 is connected to bed bottom 12 by a hinge 54. In other specific embodiments, tailgate 18 is in a sliding relationship with bed bottom 12 in grooves 56 in side walls 16.

In a specific embodiment, truck bed 10 is the bed of a conventional pick-up truck. In another specific embodiment, truck bed 10 is the bed of a conventional quarter-ton to 5 ton truck.

In some embodiments, truck bed 10 is formed of a plurality of spaced apart, longitudinally extending ribs 28 formed from the steel of truck bed 10. These ribs 28 give the bed 10 both more structural strength and allow for loads to be slid onto the bed bottom 12 with less frictional force restraining the sliding movement. In all of the embodiments in which the bed bottom 12 is ribbed, surface area 26 is not ribbed to allow for the debris to be properly concentrated in a pile and removed by a conventional dustpan and broom.

In a specific embodiment, structural members 52 can be positioned beneath surface 26 to add strength to the bed bottom 12 as desired.

The bed bottom 12 and surface area 26 may be provided with an opening 30 therein through which debris may be swept to remove the debris from the bed bottom 12 and deposit the same on the ground or into a receptacle positioned beneath bed bottom 12.

Referring now to FIG. 2, an improved truck bed liner 32 is shown having a similar structure to the truck bed 10 above described. Liner 32 has a bottom 34 and front 36 and side 38 upstanding walls. Liner 32 does not have a tailgate 18, but has a rear edge 40 which, when liner 32 is positioned in the truck, overlays rear 24 boundary of the bed bottom 12. Front 36 and side 38 upstanding walls of liner 32 overlay front 14 and side 16 walls of truck bed 10.

Figure 4:
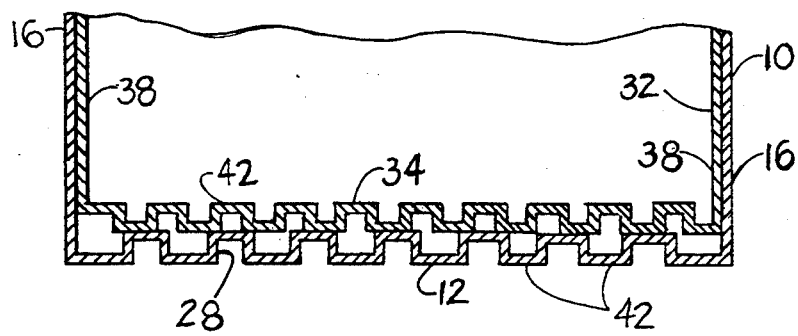
FIG. 4 is a fragmentary, cross-sectional view of another embodiment of the truck bed liner of the invention of FIG. 2 mounted in a truck bed taken substantially along section line A—A of FIG. 2.
Figure 5:
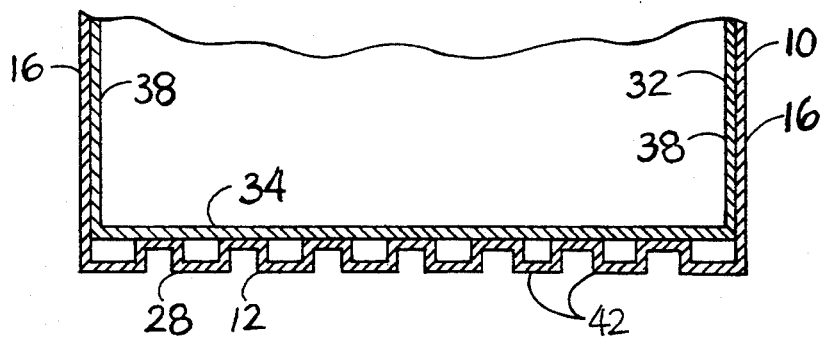
FIG. 5 is a fragmentary, cross-sectional view of still another embodiment of the truck bed liner of the invention of FIG. 2 mounted in a truck bed taken substantially along section line A—A of FIG. 2.

Liners 32 for use with ribbed bottoms may be provided to have a liner bottom 34 which is complementary to the ribbed bottom 12, or planar and ribbed and overlays the ribs 28, or ribbed with ribs 42 which would loosely fit between ribs 28 as shown in FIGS. 3, 4 and 5. In these embodiments, longitudinally extending spaced apart ribs 42 are provided either alternating the ribs 28 of the bed bottom 12, or upstanding from the bottom 12, or both, as desired, as shown in FIGS. 3, 4 and 5, respectively. The truck bed liner bottom 34 in FIGS. 3 and 4 have the advantage over the truck bed liner bottom 34 of FIG. 5 inasmuch as ventilation is provided between the truck bed 10 and the bed liner 32 to dissipate moisture.

The truck bed liner 32 like the truck bed 10 hereinabove may be provided for trucks of all kinds including pick-up trucks and larger trucks.

Like the truck bed 10 of the invention, the truck bed liner 32 is provided with a planar surface 44 adjacent to rear edge 40. Surface 44 is flat and planar and has an area sufficiently large to allow debris to be swept into a pile and removed therefrom by a conventional broom and dustpan.

The truck bed liner 32 of the invention which overlays a ribbed truck bed 10, would nave either rids 42 or no ribs immediately beneath the surface 44 adjacent the rear boundary 40 of the truck bed liner 32. If surface 44 had ribs 42, ribs 42 would alternate with ribs 28 of bed 10. In all cases, surface 44 would be supported by ribs 28 of a ribbed bed 10.

Like the truck bed 10, the truck bed liner 32 may be provided with an opening 46 in the surface 44 which communicates with opening 30 in the truck bed 10 whereby debris on the liner 32 may be swept from within the truck to the ground below or into a container located under the truck bed 10.

Figure 6:
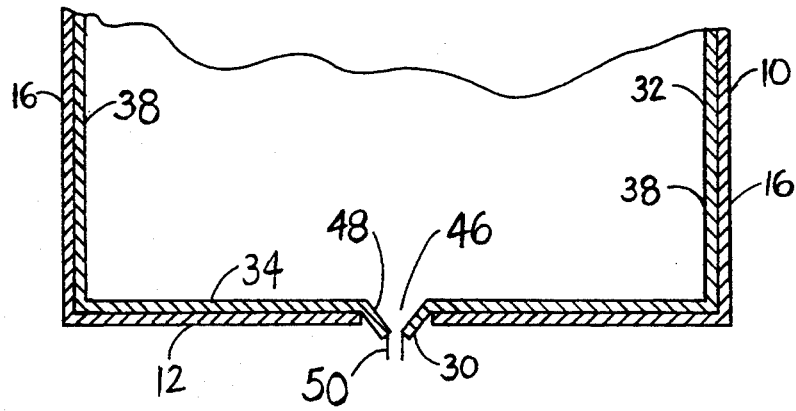
FIG. 6 is a fragmentary, cross-sectional view of the truck bed liner of the invention mounted in the truck bed taken substantially along Section line B—B of FIG. 2.

In a specific embodiment, the truck bed 10 and liner 32 may have a funnel shaped opening 48, shown in FIG. 6. Opening 48 in liner 32 would have a tubular portion 50 to fit into opening 30 in the truck bed 10 to facilitate the removal of debris from the truck bed.

In operation, the truck bed liner 32 properly positioned in the truck bed 10 and the truck bed 10 perform similarly. Thus, a description of one will suffice for both. The truck bed 10 allows for sweeping with a conventional broom debris from adjacent the front wall 14 toward the rear boundary 24. The flat, planar surface 26 adjacent the rear boundary 24, allows for all of the debris to be concentrated in a pile, or at the area where the opening 30 passes through the truck bed 10 to beneath the truck. Debris can either be swept through the opening 30, or for those embodiments without an opening 30, concentrated in a pile and removed from the truck bed 10 by use of a conventional dustpan and broom.

Both embodiments prevent the debris from being necessarily swept over the hinge or the groove or other mechanism of the tailgate 18. Thus, removing the debris from the truck bed 10 does not affect the operation of the tailgate 18 or other rear closing mechanism of the truck. In all other respects, the truck bed 10 and the truck bed liner 32 of the invention are conventional. The truck bed 10 and the truck bed liner 32 of the invention in all other aspects operate as a conventional truck bed and truck bed liner.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A truck bed chosen from the group consisting of truck beds and truck bed liners having a bottom and front and side and rear boundaries, front and side walls upstanding from said front and side boundaries of said bed bottom, respectively, a tailgate adjacent to said rear boundary of said bed bottom, said tailgate being movable between a closed position and an open position, said bed bottom having a flat surface adjacent to said tailgate and said rear boundary, said bed having a plurality of spaced apart and parallel ribs in the bottom surface which gives both said bottom added strength and facilitates loading and unloading, said ribs extending between said flat surface and said front boundary of said bottom, the junction of said ribs and said flat surface being spaced a greater distance from said rear boundary at a central portion of said bottom than adjacent said side walls, said flat surface having an area sufficiently large to sweep any debris on said surface into a pile and to remove said pile therefrom by a broom and a dustpan positioned angularly of said rear boundary, whereby said bed can be swept clean and all debris removed therefrom without having debris clog the tailgate mechanism, allowing said tailgate to move between said open and closed positions freely.

2. The truck bed of claim 1 wherein the truck bed is the bed of a conventional pick-up truck.

3. The truck bed of claim 1 wherein said flat surface has an opening therein through which debris may be removed from said bottom.

4. The truck bed of claim 3 wherein said opening is funnel shaped.

5. The truck bed of claim 1 wherein said flat surface is a surface which is a cord of a circle.

6. The truck bed of claim 1 wherein said flat surface has an area of a size sufficient to accommodate the sweeping motion of a broom angularly of said rear boundary.

7. The truck bed of claim 1 wherein said flat surface has the largest dimension thereof measured angularly to said rear boundary equal to or larger than the width of a conventional dustpan.

8. A truck bed liner having a bottom and front and side upstanding walls, said front and side walls upstanding from said front and side boundaries of said bed liner bottom, respectively, said bottom having a rear boundary for positioning adjacent to the truck's tailgate, said tailgate being movable between a closed position and an open position, said bed liner bottom having a flat surface adjacent to said tailgate and said rear boundary, said bed having a plurality of spaced apart and parallel ribs in the bottom surface which gives both said bottom added strength and facilitates loading and unloading, said ribs extending between said flat surface and said front boundary of said bottom, the junction of said ribs and said flat surface being spaced a greater distance from said rear boundary at a central portion of said bottom than adjacent said side walls, said flat surface having an area sufficiently large to sweep any debris on said surface into a pile and remove therefrom by a broom and dustpan positioned angularly of said rear boundary, whereby said bed liner can be swept clean and all debris removed therefrom without having debris clog the tailgate mechanism, allowing said tailgate to move between said open and closed positions freely.

9. The truck bed liner of claim 8 wherein said liner is a liner for a conventional pick-up truck.

10. The truck bed liner of claim 8 wherein said ribs are positioned to be placed between the ribs of a truck bed.

11. The truck bed liner of claim 10 where said liner ribs have a transverse dimension smaller than the spacing between said truck bed ribs.

12. The truck bed liner of claim 8 wherein said bed liner bottom has at least one rib secured thereto beneath said surface.

13. The truck bed liner of claim 12 wherein said surface has an opening therein through which debris may be removed from said liner bottom.

14. The truck bed liner of claim 13 wherein said opening is funnel shaped.

15. The truck bed liner of claim 8 wherein said flat surface has an area of a size sufficient to accommodate the sweeping motion of a broom angularly of said rear boundary.

16. The truck bed liner of claim 8 wherein said flat surface has the largest dimension thereof measured angularly to said rear boundary equal to or larger than the width of a dustpan.

* * * * *